(12) United States Patent
Iizaka et al.

(10) Patent No.: US 8,944,324 B2
(45) Date of Patent: Feb. 3, 2015

(54) COMMODITY RECOGNITION APPARATUS AND COMMODITY RECOGNITION METHOD

(71) Applicant: Toshiba Tec Kabushiki Kaisha, Shinagawa-ku, Tokyo (JP)

(72) Inventors: Hitoshi Iizaka, Shizuoka-ken (JP); Hidehiro Naito, Shizuoka-ken (JP); Hiroshi Sugasawa, Miyagi-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 74 days.

(21) Appl. No.: 13/749,000

(22) Filed: Jan. 24, 2013

(65) Prior Publication Data

US 2013/0193210 A1    Aug. 1, 2013

(30) Foreign Application Priority Data

Jan. 30, 2012  (JP) ................................. 2012-016328
Mar. 5, 2012  (JP) ................................. 2012-047827

(51) Int. Cl.
*G06K 15/00* (2006.01)
*G06K 7/00* (2006.01)
*G07G 1/00* (2006.01)

(52) U.S. Cl.
CPC ............ *G06K 7/0004* (2013.01); *G07G 1/0045* (2013.01)
USPC ............................. 235/383; 235/385; 235/454

(58) Field of Classification Search
CPC ... G06Q 20/20; G06Q 20/201; G06Q 20/208; G06Q 20/204; G07G 1/0036; G07G 1/0045; G07G 1/0054; G07G 1/0063; G07G 1/0072; G07G 1/0081

USPC .......................................... 235/383, 385, 454
See application file for complete search history.

(56) References Cited

U.S. PATENT DOCUMENTS

2012/0037699 A1 *   2/2012   Sugita ........................... 235/383

FOREIGN PATENT DOCUMENTS

| JP | 07-244782 | 9/1995 |
| JP | 2004-206357 | 7/2004 |
| JP | 2008-033640 | 2/2008 |
| JP | 2009-093289 | 4/2009 |

OTHER PUBLICATIONS

Japanese Office Action for Japanese Application No. 2012-286199 mailed Jan. 28, 2014 corresponding to U.S. Appl. No. 13/749,000, filed Jan. 24, 2013.

* cited by examiner

*Primary Examiner* — Kristy A Haupt
(74) *Attorney, Agent, or Firm* — Amin, Turocy & Watson, LLP

(57) ABSTRACT

A commodity recognition apparatus comprises a function of recognizing a commodity in an image from the image captured by an image capturing unit, and a function of recognizing a data code attached to the commodity in the image from the image, and can switch these functions by a switching unit. The commodity recognition apparatus outputs the information of the commodity recognized by commodity recognition processing or the information of the data code recognized by data code recognition processing to a POS terminal.

9 Claims, 13 Drawing Sheets

| COMMODITY CODE | COMMODITY CATEGORY | COMMODITY NAME | UNIT PRICE | ... | COMMODITY APPEARANCE FEATURE PARAMETER |
|---|---|---|---|---|---|
| | | | | | |
| | | | | | |
| | | | | | |
| | | | | | |
| | | | | | |

FIG.7

| COMMODITY NAME | UNIT PRICE | QUANTITY | PRICE |
|---|---|---|---|
| ○○○○○ | × |  | △△△ |
|  |  |  |  |
|  |  |  |  |
|  |  | AUTOMATIC RECOGNITION |  |
|  |  |  |  |
|  |  |  |  |

FIG.8

| COMMODITY NAME | UNIT PRICE | QUANTITY | PRICE |
|---|---|---|---|
| ○○○○○ | × |  | △△△ |

IN AUTOMATIC RECOGNITION

FIG.9

| COMMODITY NAME | UNIT PRICE | QUANTITY | PRICE |
|---|---|---|---|
| ○○○○○ | × | | △△△ |

CANCELLATION

OK

QUANTITY

○○PRODUCT  APPLE
  1 PIECE     UNIT PRICE 200    200

FIG.10

| COMMODITY NAME | UNIT PRICE | QUANTITY | PRICE |
|---|---|---|---|
| ○○○○○ | × | | △△△ |

```
1 2 3
4 5 6
7 8 9
0 Enter
```

○○PRODUCT  APPLE
  2 PIECES    UNIT PRICE 200    400

COMMODITY RECOGNITION APPARATUS AND COMMODITY RECOGNITION METHOD

CROSS-REFERENCE TO RELATED APPLICATION

The present application is based upon and claims the benefit of priorities from Japanese Patent Application No. 2012-016328 filed on Jan. 30, 2012 and Japanese Patent Application No. 2012-047827 filed on Mar. 5, 2012, the entire contents of which are hereby incorporated by reference.

FIELD

Embodiments described herein relate to a commodity recognition apparatus and a commodity recognition method.

BACKGROUND

As one of data codes, a barcode exists. The barcode denoting the inherent commodity code of a commodity is generally attached to the sales commodity in a supermarket. A commodity recognition apparatus reading the commodity code of the commodity by using a scanner to scan the barcode attached to the commodity is widely popularized. A commodity recognition apparatus reading the commodity code of the commodity by recognizing the barcode attached to the commodity from the image of the commodity captured by an image capturing unit such as a CCD camera is also developed. The commodity code read out by these commodity recognition apparatuses is output to a POS (Point Of Sales) terminal, so as to be provided for commodity (article) sales data processing.

However, not all commodities are always attached barcodes. For example, loose vegetables, loose fruits and loose delicatessens are often without barcode attached. Therefore, in order to cope with such a commodity without barcode attached, a display device is generally set as a touch panel for the former commodity recognition apparatus. Moreover, the screen of the touch panel displays the image of the commodity without barcode attached, and if the commodity is selected from the touch input of an operator, the commodity code of the selected commodity is output from the commodity recognition apparatus to the POS terminal.

BRIEF DESCRIPTION OF THE DRAWINGS

FIG. 7 is a plan showing an example of a registration screen displayed on a touch panel in the commodity recognition apparatus of the system;

FIG. 8 is a plan showing an example of an image recognition screen displayed on the touch panel in the commodity recognition apparatus of the system;

FIG. 9 is a plan showing an example of a commodity determination screen displayed on the touch panel in the commodity recognition apparatus of the system;

FIG. 10 is a plan showing an example of a quantity input screen displayed on the touch panel in the commodity recognition apparatus of the system;

DETAILED DESCRIPTION

In one embodiment, a commodity recognition apparatus comprises an image capturing unit a commodity recognition unit, a data code recognition unit, a switching unit and an output unit. An image capturing unit captures an image of a commodity. The commodity recognition unit recognizes the commodity in the image from the image captured by the image capturing unit (scanner). The data code recognition unit recognizes a data code attached to the commodity in the image from the image. The switching unit switches to enable the commodity recognition processing executed by the commodity recognition unit or the data code recognition processing executed by the data code recognition unit to become valid. The output unit outputs the information of the commodity recognized by the commodity recognition unit or the information of the data code recognized by the data code recognition unit.

Hereinafter, the embodiments of the commodity recognition apparatus are described with reference to drawings. The embodiments are conditions applied to the longitudinal commodity recognition apparatus erected on a checkout counter arranged in a store such as a supermarket.

A First Embodiment

Figure 1:
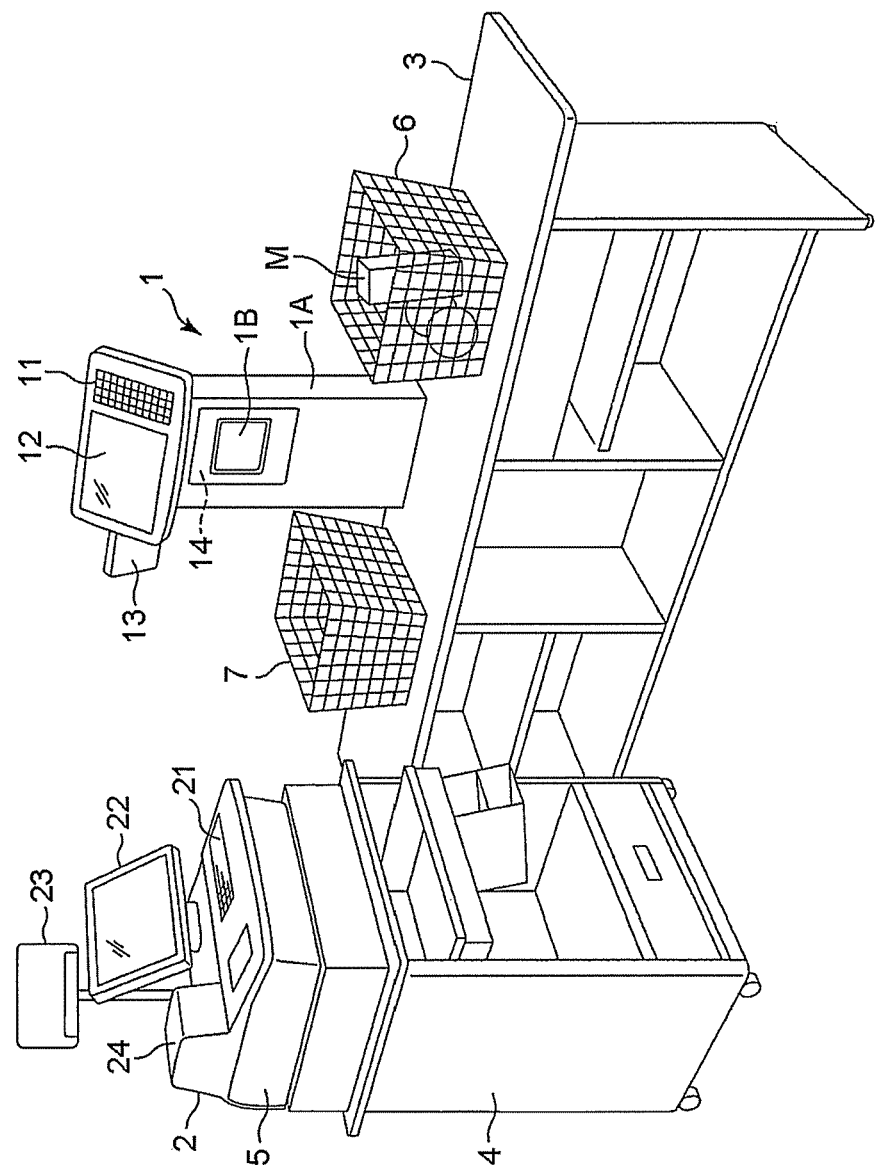
FIG. 1 is an outside view of a store checkout system according to a first embodiment.

FIG. 1 is an outside view of a store checkout system according to an embodiment. The system comprises the commodity recognition apparatus 1 as a registration unit and a POS (Point Of Sales) terminal 2 as a settlement unit. The commodity recognition apparatus 1 is mounted on the checkout counter 3. The POS terminal 2 is arranged on a register 4 through a drawer 5. The commodity recognition apparatus 1 and the POS terminal 2 are electrically connected by a communication cable which is not shown in figures.

The commodity recognition apparatus 1 comprises a keyboard 11, a touch panel 12 and a display for customer 13 as devices needed for the registration of the commodity. These display and operation devices (the keyboard 11, the touch panel 12 and the display for customer 13) are mounted on a thin rectangular housing 1A forming a main body of the commodity recognition apparatus 1.

A built-in image capturing unit 14 is arranged in the housing 1A. A rectangular scanning window 1B is formed on the front surface of the housing 1A. The image capturing unit 14 comprises a CCD (Charge Coupled Device) image capturing component serving as an area image sensor, a drive circuit of the CCD image capturing component, and an image capturing lens imaged the image of an image capturing area on the CCD image capturing component. The image capturing area refers to the area of a frame image imaged on the area of the CCD image capturing component through the image capturing lens from the scanning window 1B. The image capturing unit 14 outputs the image of the image capturing area imaged on the CCD image capturing component through the image capturing lens.

The POS terminal 2 comprises a keyboard 21, a display for operator 22, a display for customer 23 and a receipt printer 24 as devices needed for settlement.

The checkout counter 3 is elongated shape along a customer passage at its inner side.

The register 4 is located generally vertically to the settlement counter 3 on the nearer side of the end of the settlement counter 3 of the downstream side of the movement direction of a customer moving along the settlement counter 3. The nearer sides of the checkout counter 3 and the nearer sides of the register 4 are the space for a salesclerk in charge of settlement (so-called cashier).

The housing 1A of the commodity recognition apparatus 1 is erected in the approximate center of the checkout counter 3 in the way of enabling the keyboard 11, the touch panel 12 and the scanning window 1B to respectively face to the cashier at the near body side. The display for customer 13 of the commodity recognition apparatus 1 is mounted on the housing 1A in the way of facing to the customer passage.

A load-bearing surface of the commodity recognition apparatus 1 separated from the checkout counter 3, which is positioned at the upstream side along the movement direction of the customer forms a space placed a shopping basket 6 in which the commodity M which is purchased by the customer and unregistered is put. A load-bearing surface at the downstream side forms a space placed a shopping basket 7 in which the commodity M which has been already registered by the commodity recognition apparatus 1 is put.

Figure 2:
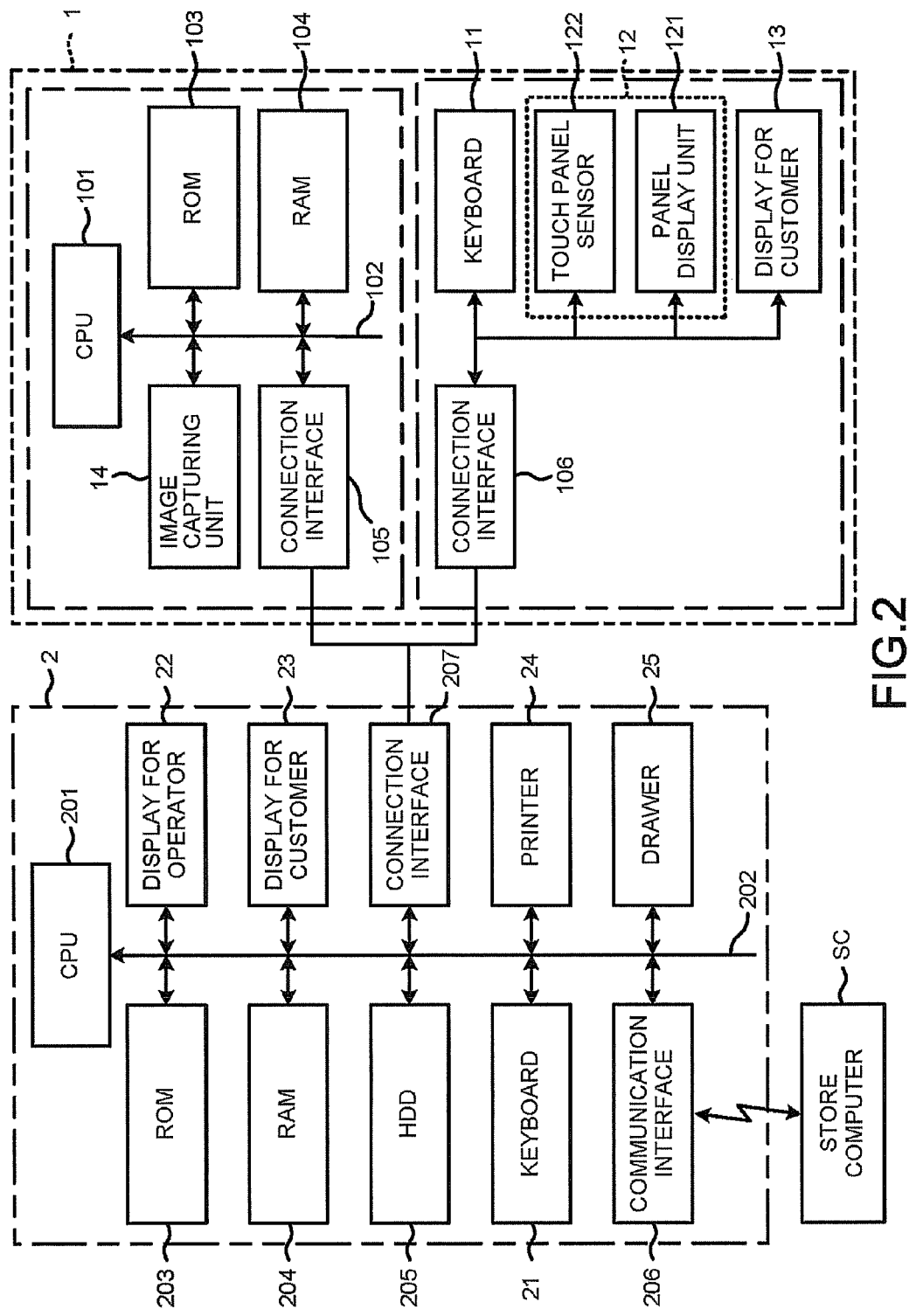
FIG. 2 is a block diagram showing hardware compositions of a commodity recognition apparatus and a POS terminal which are assembled in the system.

FIG. 2 is a block diagram showing hardware compositions of the commodity recognition apparatus 1 and the POS terminal 2. The commodity recognition apparatus 1 is equipped with a CPU (Central Processing Unit) 101 as a control unit main body. An ROM 103 and an RAM 104 are connected with the CPU 101 through a bus line 102 such as an address bus, a data bus and the like. A program executed by the CPU 101 is stored in the ROM 103.

The image capturing unit 14 is connected with the bus line 102 through an input-output circuit (not shown in the figures). The keyboard 11, the touch panel 12 and the display for customer 13 as the display and operation devices are connected with the bus line 102 through a connection interface 105 and a connection interface 106. The touch panel 12, for example, comprises a panel display unit 121 using a liquid crystal display and a touch panel sensor 122 overlapped and configured on the screen of this display unit.

The POS terminal 2 is also equipped with a CPU 201 as the control unit main body. An ROM 203, an RAM 204, an HDD (Hard Disk Drive) apparatus 205, a communication interface 206 and a connection interface 207 are connected with the CPU 201 through a bus line 202. In addition, each unit of the keyboard 21, the display operator 22, the display customer 23, the printer 24 and the drawer 5 is also connected with the bus line 202 through their input/output circuits respectively (not shown in the figures).

The communication interface 206 is connected with a store computer SC serving as a main center of the store through a network such as an LAN (Local Area Network). The POS terminal 2 uses such connection to transmit the data to and from the store computer SC. For example, the POS terminal 2 receives a commodity data file 8 from the store computer SC. The received commodity data file 8 is stored in the HDD apparatus 205.

The connection interface 207 is connected with the two connection interfaces 105 and 106 of the commodity recognition apparatus 1 through the communication cable. By such connection, the POS terminal 2 can carry out the reception and the sending of the data with the commodity recognition apparatus 1. For example, the POS terminal 2 receives commodity information read by the commodity recognition apparatus 1. In addition, the POS terminal 2 sends the data of the commodity data file 8 to the commodity recognition apparatus 1.

Figures 3, 4:
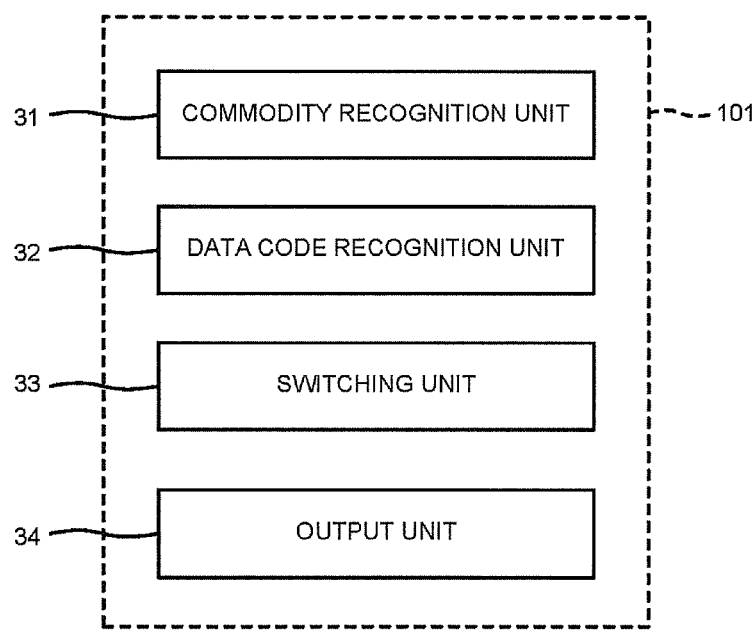
FIG. 3 is a schematic diagram showing a data structure of a commodity data file used in the system.
FIG. 4 is a schematic diagram showing function compositions realized by a CPU in the commodity recognition apparatus of the system.

FIG. 3 is a schematic diagram showing a data structure of the commodity data file 8. As shown in FIG. 3, in the commodity data file 8, the property (commodity category), the name (commodity name), the unit price, the appearance feature parameter of the commodity are stored relevant with a commodity code recognizing each commodity. The appearance feature parameter quantifies a feature quantity of the standard appearance of the commodity, such as the shape, the surface hue, the pattern, the concave-convex state and the like of the commodity, for each commodity.

In the store checkout system comprising the commodity recognition apparatus 1 and the POS terminal 2 with the compositions, as shown in FIG. 4, the CPU 101 of the commodity recognition apparatus 1 has functions as the following units: a commodity recognition unit 31 recognizing the commodity included in the image from the image captured by the image capturing unit 14 as the image capturing unit, a data code recognition unit 32 recognizing the data code attached to the commodity included in the image from the image captured by the image capturing unit 14, a switching unit 33 switching to enable the commodity recognition processing executed by the commodity recognition unit 31 or the data code recognition processing executed by the data code recognition unit 32 to become valid, and an output unit outputting the information of the commodity recognized by the commodity recognition unit 31 or the information of the data code recognized by the data code identification unit 32. The above functions are realized according to a commodity recognition program stored in the ROM 103.

Figure 5:
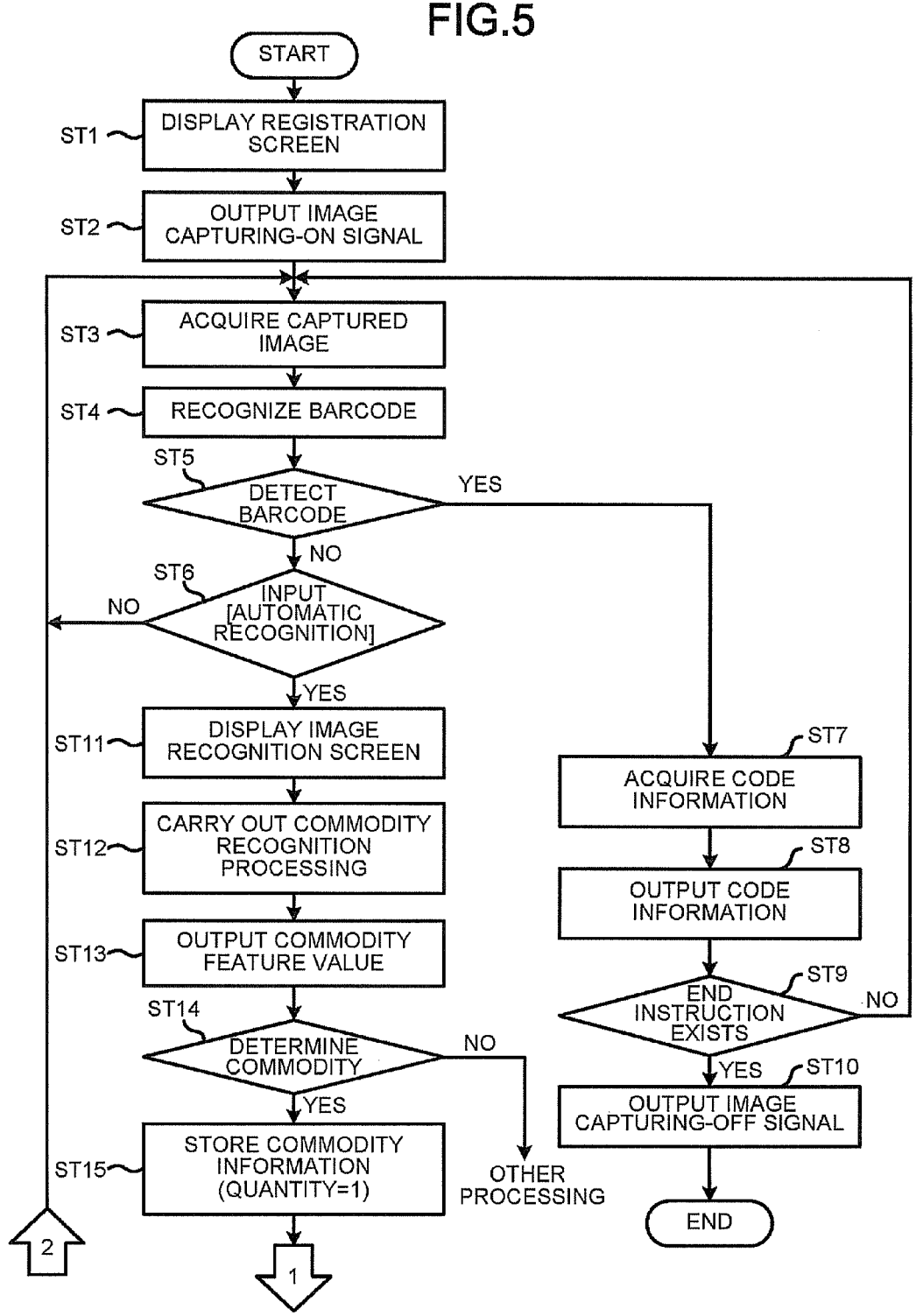
FIG. 5 is a flow chart showing the main procedures of the information processing executed by the CPU according to a commodity recognition program in the commodity recognition apparatus of the system.
Figure 6:
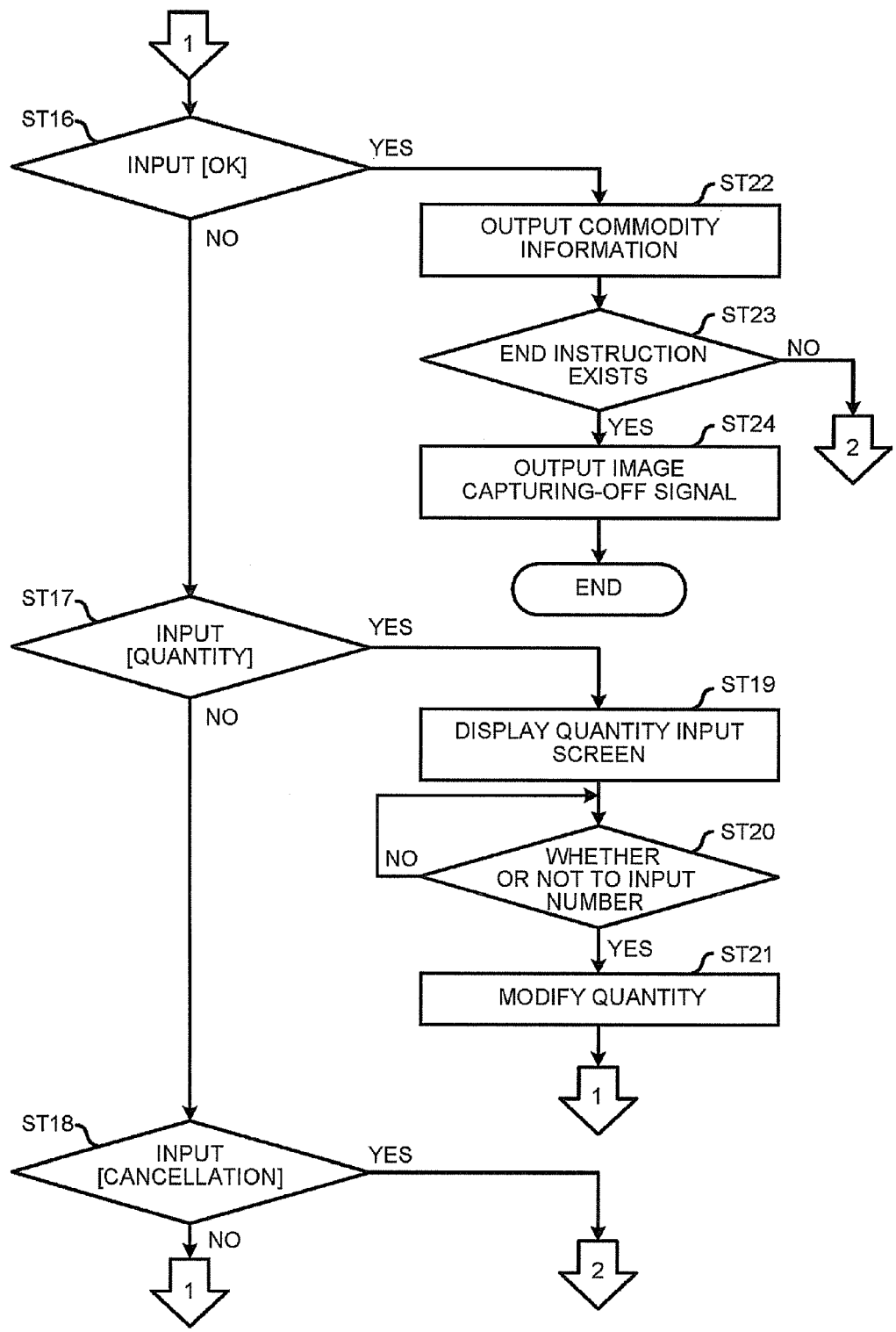
FIG. 6 is a flow chart showing the main procedures of the information processing executed by the CPU according to the commodity recognition program in the commodity recognition apparatus of the system.

Each function of the CPU 101 is described by using flow charts in FIG. 5 and FIG. 6. The flow charts show the main procedures of the information processing executed by the CPU 101 according to the commodity recognition program.

The processing, for example, is started if an instruction command indicating the start of commodity registration input from the POS terminal 2 through the connection interface 105. First, the CPU 101 displays a registration screen 40 on the panel display unit 121 of the touch panel (12) (ST1).

An example of the registration screen 40 is shown in FIG. 7. As shown in the figure, the registration screen 40 has a current area 41 and a details area 42. The current area 41 is an area displayed the commodity name, the unit price, the quantity, the price of a newest registered commodity. The details area 42 is an area displayed the commodity name, the unit price, the quantity, the price of each commodity registered in one commodity deal. In addition, the image of an [automatic recognition] button 43 is also displayed in the registration screen 40. The functions of the [automatic recognition] button 43 are described hereinafter.

Next, the CPU 101 outputs an image capturing-on signal to the image capturing unit 14 (ST2). The image capturing unit 14 starts working in the image capturing area according to the image capturing-on signal. The frame images captured by the image capturing unit 14 are stored in the RAM 104 in sequence. Therefore, the CPU 101 acquires the frame images stored in the RAM 104 (ST3).

The CPU 101 analyzes the image to recognize a barcode as one of the data codes if acquiring the frame image each time. A barcode recognition technology based on image analysis, for example, is recorded in the Japanese Patent Application Publication No. 2008-033640.

The CPU 101 judges whether or not the barcode can be recognized from the frame image (ST5). If the barcode cannot be recognized (in ST5, NO), the CPU 101 judges whether or not the image of the [automatic recognition] button 43 is subjected to a touch operation (ST6). If the image is not subjected to the touch operation (in ST6, NO), the CPU 101 acquires the following frame image from the RAM 104 (ST3).

If the barcode can be recognized from the frame image (in ST5, YES), the CPU 101 reads binary code information from the barcode (ST7). Afterwards, the CPU 101 outputs the read code information to the POS terminal 2 through the connection interface 105 (ST8).

The CPU 201 of the POS terminal 2 uses the code information to retrieve the commodity data file 8 if receiving the code information from the commodity recognition apparatus 1. Afterwards, if the commodity code is consistent with the detected code information, the relevant information with the commodity code such as commodity name, the unit price is read out. Afterwards, the commodity code, the commodity name, the unit price and commodity sales data including a number of sales, a sales price are subjected to registration processing towards the RAM 204. Moreover, registered commodity information such as the commodity code, the commodity name, the unit price, the number of sales, the sales price is output to the commodity recognition apparatus 1 through the connection interface 207. The registered commodity information output to the commodity recognition apparatus 1 is provided for the touch panel 12 through the connection interface 106 and is displayed in the current area 41 of the registration screen 40 displayed on the panel display unit 121.

In ACT ST8, after the code information is output to the POS terminal 2, the CPU 101 judges whether or not an instruction code indicating the end of the commodity registration input (ST9). If the end indication command is not input (in ST9, NO), the CPU 101 acquires the next frame image from the RAM 104 (ST3).

If the end indication command is input through the connection interface 105 (in ST9, YES), the CPU 101 outputs an image capturing-off signal to the image capturing unit 14 (ST10). The image capturing unit 14 ends the image capturing of the image capturing area according to the image capturing-off signal. The end indication command, for example, is output to the commodity recognition apparatus 1 from the POS terminal 2 in correspondence to that a "total" key configured on the keyboard 11 is subjected to an input operation. That is, the CPU 201 of the POS terminal 2 outputs the end indication command to the commodity recognition apparatus 1 if the key signal of the [total] key is input from the commodity recognition apparatus 1. The registration summary processing of one commodity deal is executed based on commodity sales data registered in the RAM 204.

If the image of the [automatic recognition] button 43 is detected to be touch operated in ACT ST6 (in ST6, YES), the CPU 101 displays an image recognition screen 50 on the panel display unit 121. Afterwards, the frame image captured by the image capturing unit 14 is displayed on the image recognition screen 50 (ST11).

An example of the image recognition screen 50 is shown in FIG. 8. As shown in the figure, the image recognition image 50 has a display area 51 of the frame image and is displayed on a pop-up window overlapped on the registration screen 40. At the moment, the image of the [automatic recognition] button 43 is erased from the registration screen 40.

The CPU 101 recognizes the commodity M included in the image from the frame image acquired from the RAM 104, that is, the frame image displayed on the display area 51 of the image recognition screen 50 (ST12). In detail, the CPU 101 first detects the existence of a skin color area from the frame image. If the skin color area is detected, that is, if the capturing of the operator's hands is detected, the CPU 101 extracts a contour line from the image after the frame image is subjected to binarization. Thus, the CPU 101 tries to extract the contour of the commodity M assumed to be held by the operator's hands. If the contour of the commodity M is extracted, the CPU 101 reads the feature value such as the shape, the surface hue, the pattern, the concave-convex state of the commodity from the image in the contour. If these feature values of the commodity can be read, the CPU 101 firmly believes that the commodity M can be recognized. The CPU 101 repeats the commodity recognition processing of the frame image displayed on the display area 51 until the commodity M can be recognized.

A technology recognizing an object in such an image is called as generic object recognition. For such generic object recognition, various recognition technologies are described in the following literatures.

Yanai Keiji, "present state and perspectives of generic object recognition", collected papers of information processing society, Vol. 48, No. SIG16 [retrieved on Aug. 10, 2010], website <URL: http://mm.cs.uec.ac.jp/IPSJ-TCVIM-Yanai.pdf>.

A technology carrying out the generic object recognition by carrying out area segmentation on the image aiming at each object is described in the following literatures.

Jamie Shotton and colleagues, "Semantic Texton Forests for Image Categorization and Segmentation", [retrieved on Aug. 10, 2010], website: <URL: http://citeseerx.ist.psu.edu/viewdoc/download?doi=10.1.1.145.3036&rep=rep1&type=pdf>.

If the commodity M can be recognized from the frame image, the CPU 101 outputs the feature value data of the recognized commodity M to the POS terminal 2 (ST13).

The CPU 201 of the POS terminal 2 compares the feature value data with the appearance feature parameter of each commodity stored in the commodity data file 8 if the feature value data of the commodity M are input from the commodity recognition apparatus 1. Afterwards, the commodity with the appearance feature parameter which is the most similar to the feature value of the commodity M is determined as the commodity M.

If the commodity M is determined, the CPU 201 reads out the commodity code, the commodity name, the unit price of the commodity M from the commodity data file 8. The number of sales is set as "1" and the sales price is calculated. Afterwards, determined commodity information such as the commodity code, the commodity name, the unit price, the number of sales, the sales price is output to the commodity recognition apparatus 1 through the connection interface 207. The determined commodity information output to the commodity recognition apparatus 1 is provided for the touch panel through the connection interface 106 and is displayed in the current area 41 of the registration screen 40 displayed on the panel display unit 121.

A display example of the registration screen 40 at the moment is shown in FIG. 9. As shown in the figure, the name, the unit price, the number, the price of the commodity M recognized from the frame image is displayed in the current area 41 of the registration screen 40. The images of an [OK] button 44, a [quantity] button 45 and a [cancellation] button 46 are also displayed.

The CPU 101 outputting the feature value data of the commodity M to the POS terminal 2 in ACT ST13 waits the determined commodity information (ST14). Afterwards, if the determined commodity information is received from the POS terminal 2 through the connection interface 105 (in ST14, YES), the CPU 101 stores the determined commodity information in the RAM 104 (ST15). Next, the CPU 101 waits the touch operation from any one of the button image of the [OK] button 44, the [quantity] button 45 or the [cancellation] button 46 of the touch panel 12 (ST16, ST17, ST18).

Herein, if the image of the [cancelation] button 46 is detected to be touch operated according to the signal of the touch panel sensor 122 input through the connection interface 105 (in ST18, YES), the CPU 101 acquires the next frame image from the RAM 104 (ST3). At the moment, the image of the [automatic recognition] button 43 replaces the [OK] button 44, the [quantity] button 45 and the [cancelation] button 46 and is displayed on the registration screen 40 again.

If the image of the [quantity] button 45 is detected to be touch operated according to the signal of the touch panel sensor 122 input through the connection interface 105 (in ST17, YES), the CPU 101 displays a quantity input screen 60 on the panel display unit 121 (ST19).

One display example of the quantity input screen 60 is shown in FIG. 10. As shown in the figure, the quantity input screen 60 comprises numeric keys [0]-[9] and an [Enter] key, and moreover, is displayed on the pop-up window overlapped on the registration screen 40.

The CPU 101 waits that the quantity is input from the quantity input screen 60 (ST20). If detecting the [Enter] key input after the number setting carried out by using the numeric key according to the signal of the touch panel sensor 122 (in ST20, YES), the CPU 101 recognizes the setting data as the quantity. Afterwards, the data of the number of sales stored in the RAM 104 are changed into the quantity after the setting. The data of the sales price is also changed into a price obtained through multiplying the unit price by the quantity after the setting (ST21). At the moment, as shown in FIG. 10, the number of sales and the sales price displayed on the current area 41 are also changed in the same way. Afterwards, the CPU 101 waits again that any button image of the [OK] button 44, the [quantity] button 45 or the [cancellation] button 46 is subjected to the touch operation (ST16, ST17, ST18).

On one hand, if the image of the [OK] button 44 is detected to be touch operated according to the signal of the touch panel sensor 122 (in ST16, YES), the CPU 101 outputs the determined commodity information such as the commodity code, the commodity name, the unit price, the number of sales, the sales price stored in the RAM 104 to the POS terminal (ST22).

The CPU 201 of the POS terminal 2 receiving the determined commodity information from the commodity recognition apparatus 1 through the connection interface 207 carries out the registration processing on the determined commodity information as the commodity sales data in the RAM 204.

After outputting the determined commodity information to the POS terminal 2 in ACT ST22, the CPU 101 judges whether or not the instruction command indicating the end of the commodity registration input (ST23). If the end indication command is not input (in ST23, NO), the CPU 101 acquires the next frame image from the RAM 104 (ST3). At the moment, the image of the [automatic recognition] button 43 replaces the [OK] button 44, the [quantity] button 45 and the [cancelation] button 46 and is displayed on the registration screen 40 again.

If the end indication command is input (in ST23, YES), the CPU 101 outputs the image capturing-off signal to the image capturing unit 14 (ST24). The image capturing unit 14 ends the image capturing according to the image capturing-off signal.

In this way, the commodity recognition apparatus forms the data code recognition unit 33 by the processing in ACT ST4 of information processing procedures executed by the CPU 101 according to the commodity recognition program, forms the commodity recognition unit 31 by the processing in ACT ST12, forms the switching unit 33 by the processing in ACT ST6, and forms the output unit 34 by the processing in ACT ST8 or ST13.

The recognition processing of the data code (barcode) executed by the data code recognition unit 32 can be carried out after the instruction command indicating the start of the commodity registration input, but the commodity recognition processing executed by the commodity recognition unit 31 cannot be carried out until the touch operation on the image of the [automatic recognition] button 43. if the information of the commodity recognized in the commodity recognition processing is output to the POS terminal 2, the processing returns to the processing in ACT ST3. That is, the recognition processing of the data code executed by the data code recognition unit 32 becomes valid.

In this way, the commodity recognition apparatus 1 takes the recognition processing of the data code executed by the data code recognition unit 32 as default processing. Afterwards, if the switching is announced due to the operation input of the automatic recognition button 43, the non-default processing, that is, the commodity recognition processing executed by the commodity recognition unit 31, becomes valid. Afterwards, the non-default commodity recognition processing is ended if one commodity is recognized, and the recognition processing of the data code as the default processing becomes valid again.

The commodity recognition apparatus 1 displays the image recognition screen 50 on the panel display unit 121 in ACT ST11 if the [automatic recognition] button 43 is touch operated in ACT ST6. If the image recognition screen 50 is displayed, the operator of the commodity recognition apparatus 1 can recognize the non-default processing, that is, the commodity recognition processing executed by the commodity recognition unit 31 is valid. That is, the commodity recognition apparatus 1 forms a notification unit notifying that the non-default processing is valid through the processing in ACT ST11.

If the cashier in the store where the store checkout system of the present embodiment is introduced takes out the unregistered commodity M from the shopping basket 6 each time, the cashier judges whether or not a barcode is attached to the commodity. Afterwards, if the barcode is attached, hold the barcode attached surface of the commodity over the scanning window 1B. If the act is carried out in such a way, the processing in ACT ST3, ST4, ST7 and ST8 of the information processing procedures shown in FIG. 5 are executed in sequence, and thus, the commodity name, the number of sales, the unit price and the sales price of the commodity M are displayed in the current area 41 of the registration screen 40 displayed on the touch panel 12. Moreover, the sales data of the commodity M are subjected to the registration processing towards the POS terminal 2.

On the other hand, if no barcode is attached to the commodity, after touching the image of the [automatic recognition] button 43 displayed on the touch panel 12, hold the barcode attached surface of the commodity over the scanning window 1B. If the act is carried out in such a way, the processing of in ACT ST11, ST12, ST13, ST14 and ST15 of the same information processing procedures is executed in sequence, and thus, the commodity name, the number of sales, the unit price and the sales price of the commodity M are displayed in the current area 41 of the registration screen 40.

At the moment, the number of sales is "1". If multiple commodities M exist, the cashier touches the image of the [quantity] button 45. If the act is carried out in such a way, the quantity input screen 60 is displayed, and therefore, the cashier inputs the quantity of the commodities M. If the act is carried out in such a way, the number of sales and the sales price in the current area 41 are changed. Afterwards, if the cashier touches the image of the [OK] button 47, the sales data of the commodities M whose quantity is input is subjected to the registration processing in the POS terminal 2.

In this way, in the commodity recognition apparatus 1 of the present embodiment, similar to the commodity with barcode attached, for the commodity without barcode attached, the commodity information can be read by only swiping the barcode attached surface of the commodity toward the scanning window 1B. Therefore, operation steps cannot be varied greatly between the commodity with barcode attached and the commodity without barcode attached.

Moreover, the commodity recognition apparatus 1 sets the data code recognition processing as the default processing through the data code recognition unit 32, and the commodity recognition processing executed by the commodity recognition unit 31 cannot be valid unless the image of the [automatic recognition] button 43 is touch operated. At present, the barcode as one of the data codes is generally attached to the sales commodity in the supermarket and the like, and the commodities without barcode attached are less. Therefore, for most of the commodities to be registered, the operator only needs to hold the barcode of the commodity over the scanning window 1B. For some of the commodity without barcode attached, the operator touches the image of the [automatic recognition] button 43 and holds the commodity over the scanning window 1B, and then, the commodity recognition apparatus 1 with excellent work efficiency can be provided.

If one commodity is recognized by the commodity recognition processing executed by the commodity recognition unit 31, the data code recognition processing executed by the data code recognition unit 32 is automatically returned. Therefore, the operator touches the image of the [automatic recognition] button 43 only if the commodity without barcode attached is registered. Therefore, in the store where the commodities with barcode attached are more than the commodities without barcode attached, the times of touching the [automatic recognition] button 43 are less, therefore, the operation is simplified, and the efficiency is quite high.

If the operator touches the image of the [automatic recognition] button 43, the image recognition screen is displayed on the panel display unit 121. Therefore, the operator can easily recognize the validity of the commodity recognition processing executed by the commodity recognition unit 31 according to the display from the image recognition screen 50. That is, those as effective non-default processing can be easily recognized by the operator.

A Second Embodiment

The second embodiment is described. In the first embodiment, the non-default processing, that is, the commodity recognition processing executed by the commodity recognition unit 31, is ended if one commodity is recognized. Afterwards, the default processing, that is, the data code recognition processing executed by the data code recognition unit 32, becomes valid again. Therefore, if the commodity without barcode attached is registered each time, it is necessary to touch the image of the [automatic recognition] button 43. The second embodiment is an embodiment being capable of carrying out the processing without touching the image of the [automatic recognition] button 43 if the commodities without barcode attached are registered continuously.

Figure 11:
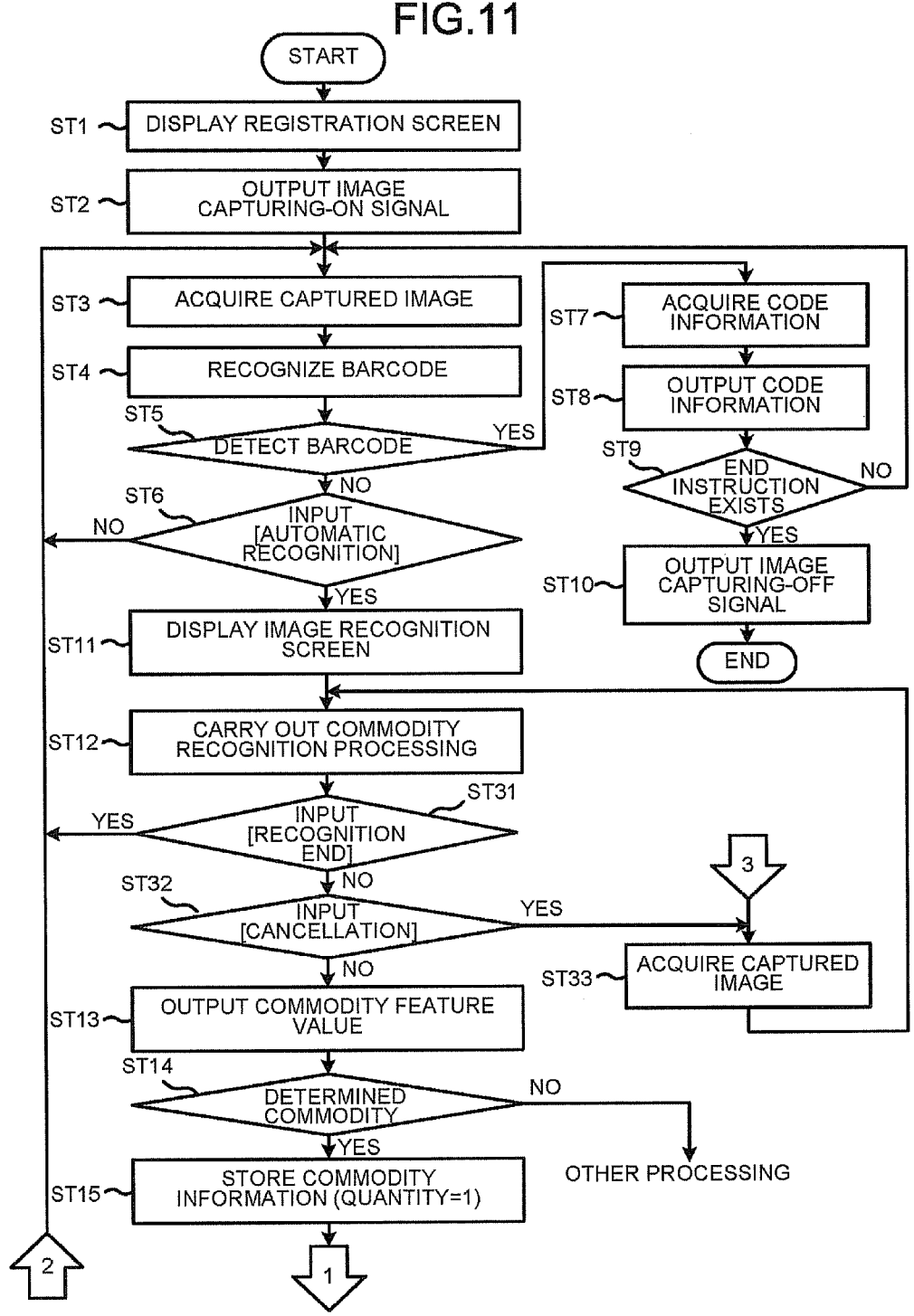
FIG. 11 is a flow chart showing the main procedures of the information processing executed by the CPU according to the commodity recognition program in the commodity recognition apparatus in a second embodiment relates.
Figure 12:
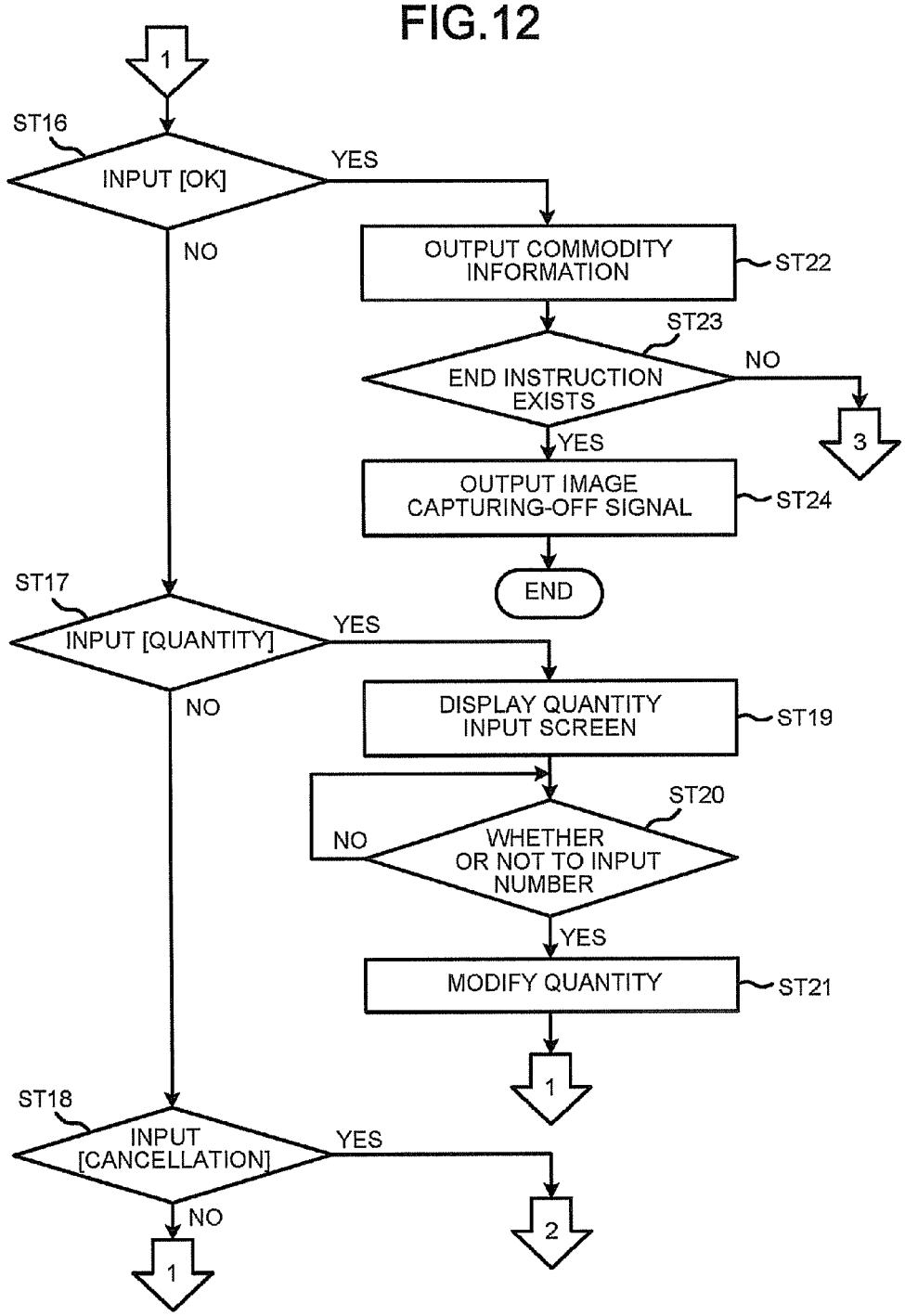
FIG. 12 is a flow chart showing the main procedures of the information processing executed by the CPU according to the commodity recognition program in the commodity recognition apparatus in the second embodiment relates.

The difference between the second embodiment and the first embodiment lies in part of the information processing executed by the CPU 201 according to the commodity recognition program, and the main procedures of the information processing in the second embodiment are shown in flowcharts of FIG. 11 and FIG. 12. The parts that are same as the information processing procedures of the first embodiment shown in FIG. 5 and FIG. 6 are marked with same symbols, and detailed descriptions are omitted.

As shown in FIG. 11, in the second embodiment, if the image of the [automatic recognition] button 43 is detected to be touch operated in ACT ST6 (in ST5, YES), the CPU 101 also displays the image recognition screen 50 on the panel display unit 121. Afterwards, the frame image captured by the image capturing unit 14 is displayed on the image recognition screen 50 (ST11).

Figure 13:
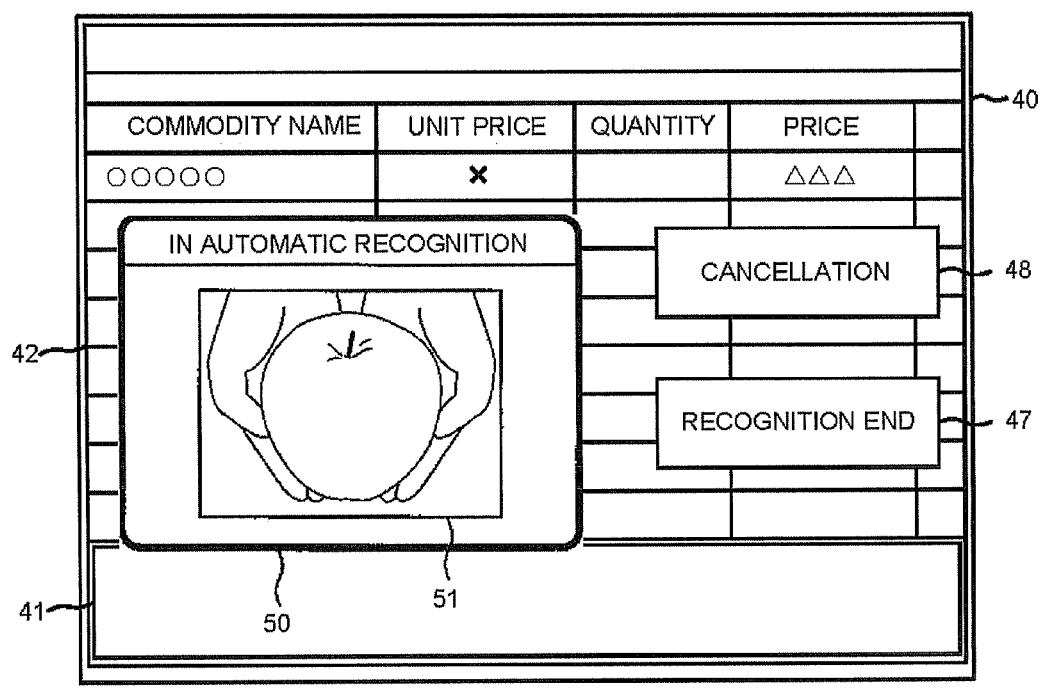
FIG. 13 is a plan showing an example of the image recognition screen displayed on the touch panel in the commodity recognition apparatus in the second embodiment relates.

An example of the image recognition screen 50 in the second embodiment is shown in FIG. 13. As shown in the figure, the image recognition image 50 has the display area 51 of the frame image and is displayed on pop-up window overlapped the registration screen 40. At the moment, the image of the [automatic recognition] button 43 is cancelled from the registration screen 40, and the images of a [recognition end] button 47 and a [cancellation] button 48 are displayed instead.

Afterwards, the CPU 101 recognizes the commodity M included in the image from the frame image displayed on the display area 51 of the image recognition screen 50 (ST12). Moreover, the CPU 101 also monitors whether or not the image of the [recognition end] button 47 or the [cancellation] button 48 is touch operated (ST31, ST32). Afterwards, if the image of the [cancelation] button 48 is touch operated (in ST32, YES), the CPU 101 acquires the next frame image from the RAM 104 (ST33). Afterwards, the processing of ACT ST12 is returned, and the CPU 101 recognizes the commodity M included in the image from the acquired frame image (ST12).

Relative to that, if the image of the [recognition end] button 47 is touch operated (in ST31, YES), the CPU 101 returns to the processing of ACT ST3. Afterwards, the CPU 101 acquires the next frame image from the RAM 104 (ST3), and analyzes the image to recognize the barcode as one of the data codes (ST4).

If the commodity M can be recognized from the frame image if the image of the [recognition end] button 47 or the [cancelation] button 48 is not touch operated (NO in ST31, NO in ST32), the CPU 101 outputs the feature value data of the recognized commodity M to the POS terminal 2 (ST13). Afterwards, the CPU 101 executes the processing in ACT ST14-ST24 described of the first embodiment.

However, in the first embodiment, if the end indication command is not input in the processing in ACT ST23 (in ST23, NO), the CPU returns to the processing in ACT ST3, but in the second embodiment, the processing in ACT ST12 is returned after the processing in ACT ST33 is carried out. That is, in the first embodiment, if the end indication command is not input, the CPU 101 executes the recognition processing of the barcode after acquiring the next frame image from the RAM 104, but the CPU 101 executes the commodity recognition processing toward the next frame image in the second embodiment.

In this way, in the commodity recognition apparatus 1 of the second embodiment, if the image of the [automatic recognition] button 43 is touch operated to enter the non-default commodity recognition processing, the data code recognition processing as the default processing cannot be returned before the [recognition end] button 47 is touch operated. In other words, if the non-default processing becomes valid, a valid status is maintained before the end is announced according to the touch input of the recognition end] button 47, and if the end is announced, the default processing becomes valid. Herein, the [recognition end] button 47 functions as an announcement unit announcing the end of the non-default processing.

In the commodity recognition apparatus 1 of the second embodiment, the fussiness that the image of the [automatic recognition] button 43 must be touched each time if the commodity without barcode attached are continuously registered is eliminated.

A Third Embodiment and a Fourth Embodiment

In the first embodiment or the second embodiment, in such a status that the default processing, that is, the data code recognition processing executed by the data code recognition unit 32 is valid, if the image of the [automatic recognition] button 43 is touch operated (in ST6, YES), the non-default processing, that is, the commodity recognition processing executed by the commodity recognition unit 31 becomes valid (ST12). Nevertheless, if the recognition precision of the barcode executed by the data code recognition unit 32 is compared with the recognition precision of the commodity executed by the commodity recognition unit 31, the recognition precision of the data code recognition unit 32 is higher. Therefore, a better method is that: even though the commodity recognition processing executed by the commodity recognition unit 31 becomes valid, the data code recognition processing executed by the data code recognition unit 32 is also executed if the barcode can be recognized from the image.

The third embodiment and the fourth embodiment are described. In the third embodiment and the fourth embodiment, the commodity recognition apparatus 1 also comprises an insertion unit executing the recognition processing which does not become valid before executing the recognition processing which becomes valid by the switching unit 33, and if the recognition processing which does not become valid is executed by the insertion unit but cannot be recognized, the execution processing becoming valid is executed. The third embodiment is an embodiment in which a confirmation unit is arranged in the commodity recognition apparatus 1 in the first embodiment relates, and the fourth embodiment is an embodiment in which the confirmation unit is arranged in the commodity recognition apparatus 1 in the second embodiment relates.

Figure 14:
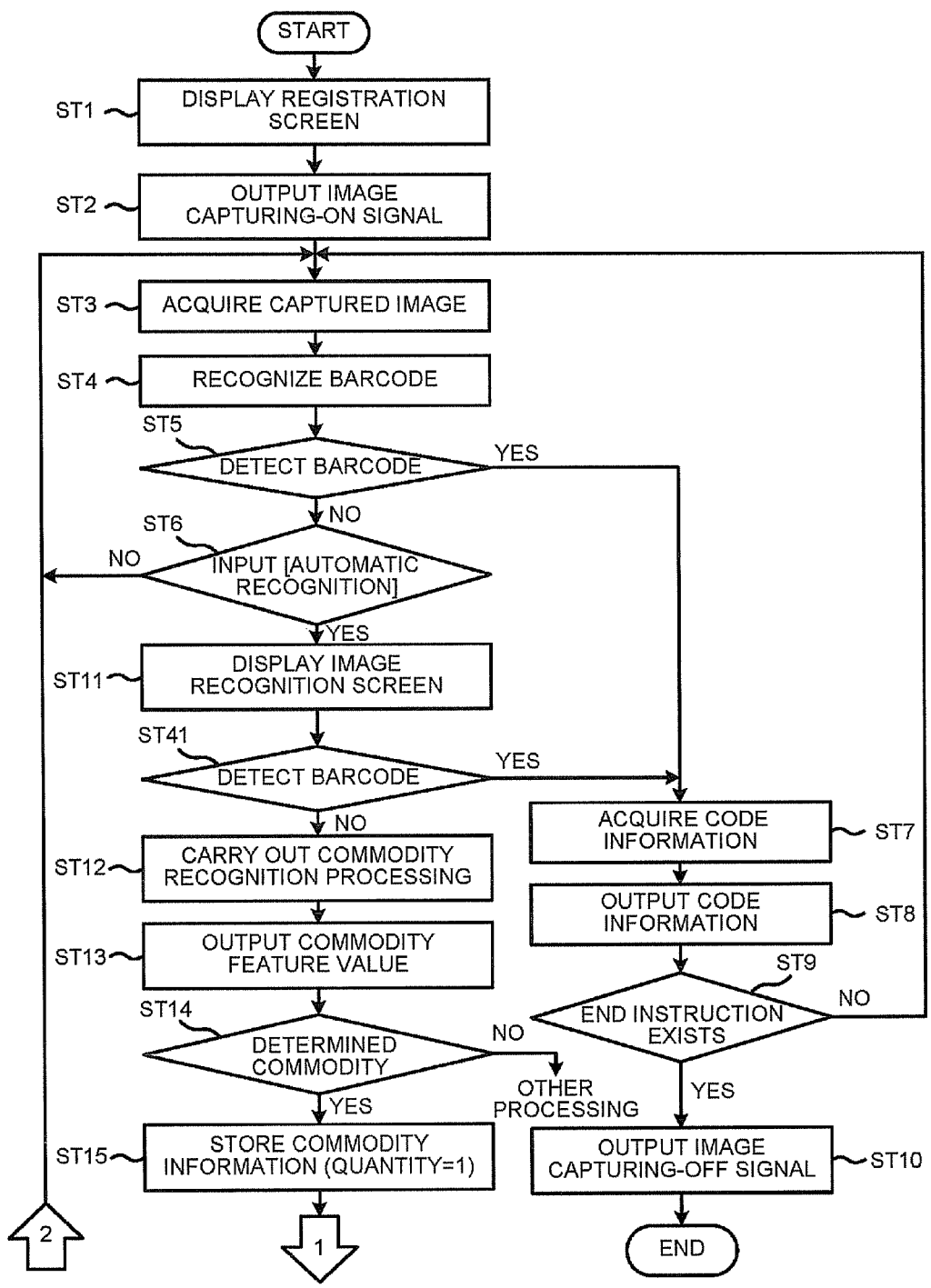
FIG. 14 is a flow chart showing the main procedures of the information processing executed by the CPU according to the commodity recognition program in the commodity recognition apparatus in a third embodiment relates.

In the commodity recognition apparatus 1 related to the third embodiment, the main procedures of the information processing which is following the commodity recognition program by the CPU 101 are shown in FIG. 14. Actions having the same processing procedures as in the first embodiment and common to processing ACTs in FIG. 5 are marked with the same symbols, and detailed descriptions are omitted.

By comparing FIG. 5 with FIG. 14, it is known that the difference between the third embodiment and the first embodiment lies in that the judgment processing in ST41 is added after the display processing of the image recognition screen in ACT ST11. That is, the CPU 101 judges whether or not the barcode can be recognized from the frame image again (ST41). Afterwards, if the barcode can be recognized (in ST41, YES), the CPU 101 reads the binary code information from the barcode (ST7). If the barcode cannot be recognized (in ST41, NO), the CPU 101 recognizes the commodity M included in the image from the frame image (ST12).

In this way, in the third embodiment, the commodity recognition apparatus 1 forms the insertion unit according to the processing in ACT ST41 from the information processing procedures executed by the CPU 101.

Figure 15:
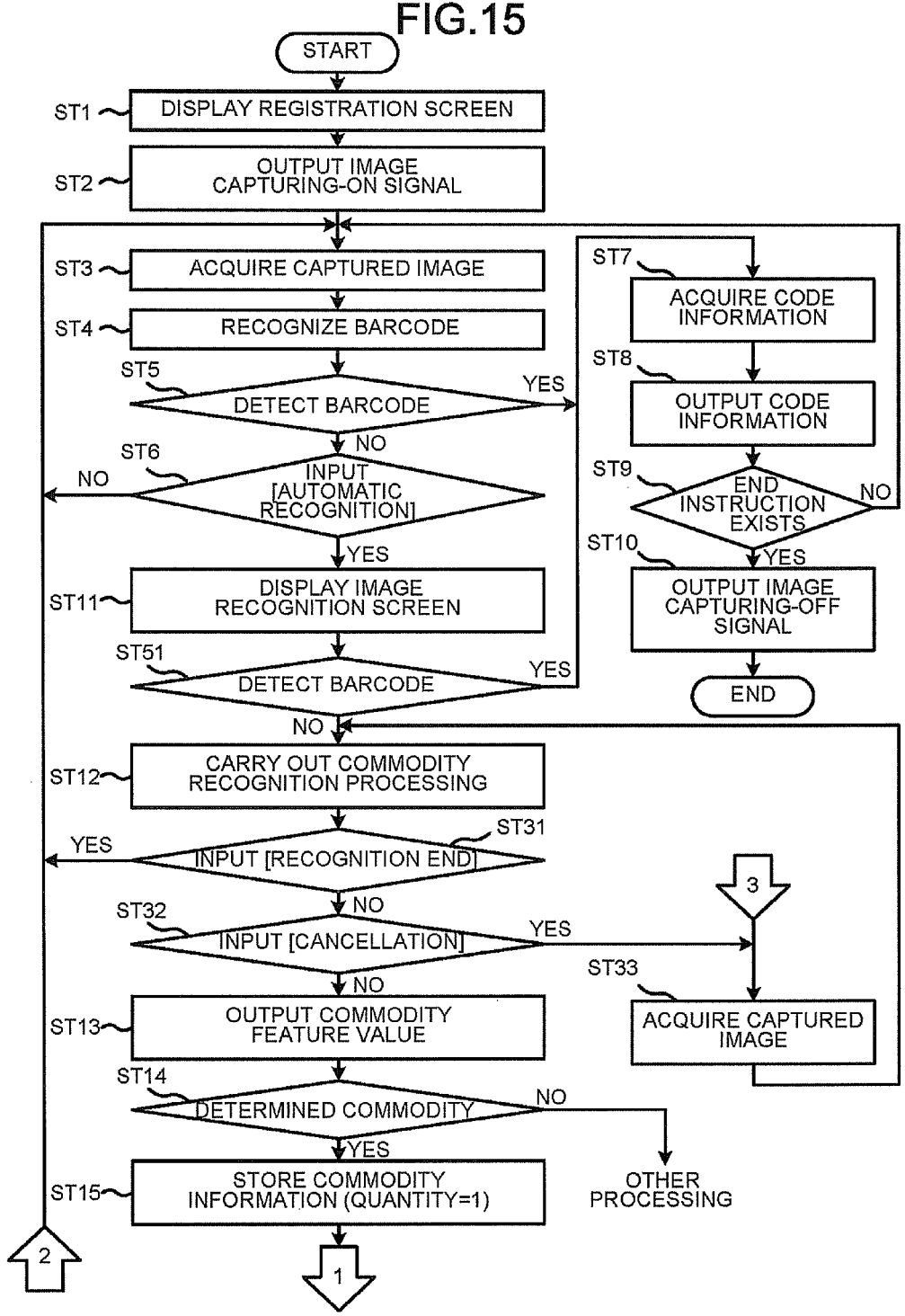
FIG. 15 is a flow chart showing the main procedures of the information processing executed by the CPU according to the commodity recognition program in the commodity recognition apparatus in a fourth embodiment relates.

Next, in the commodity recognition apparatus 1 related to the forth embodiment, the main procedures of the information processing which is following the commodity recognition program executed by the CPU 101 are shown in FIG. 15. Actions having the same processing procedures as in the second embodiment and common to processing ACTs in FIG. 11 are marked with the same symbols, and detailed descriptions are omitted.

By comparing FIG. 11 with FIG. 15, it is known that the difference between the fourth embodiment and the second embodiment lies in that the judgment processing in ST51 is added after the display processing of the image recognition screen in ACT ST11. That is, the CPU 101 judges whether not the barcode can be recognized from the frame image again (ST51). Afterwards, if the barcode can be recognized (in ST51, YES), the CPU 101 acquires the binary code information from the barcode (ST7). If the barcode cannot be recognized (in ST51, no), the CPU 101 reads the commodity M included in the image from the frame image (ST12).

In this way, in the fourth embodiment, the commodity recognition apparatus 1 forms the insertion unit according to the processing in ACT ST51 from the information processing procedures executed by the CPU 101.

According to the third embodiment or the fourth embodiment, after the operator touches the image of the [automatic recognition] button 43, the commodity recognition apparatus 1 executes the data code recognition processing as the default processing again, and judges whether or not the barcode can be recognized from the frame image. Afterwards, if the barcode cannot be recognized, the commodity recognition apparatus 1 executes the commodity recognition processing as the non-default processing, and recognizes the commodity from the frame image.

Relative to this, if the barcode can be recognized, the commodity recognition apparatus 1 acquires barcode information and outputs it to the POS terminal 2. That is, even after the operator touches the image of the [automatic recognition] button 43, the commodity recognition apparatus 1 also preferentially executes the data code recognition processing compared with the commodity recognition processing. Therefore, even though the commodity recognition processing executed by the commodity recognition unit 31 becomes valid, the data code recognition processing executed by the data code recognition unit 32 is also executed. Therefore, even if the automatic recognition button 43 is pressed down due to a mishandling, the barcode scanning can be also carried out.

A Fifth Embodiment

From the first embodiment to the fourth embodiment, the image of the [automatic recognition] button 43 is displayed on the registration screen 40 as a switch enabling the switching unit 33 to act. Therefore, in the store checkout system shown in FIG. 1, if the commodity without barcode attached is registered, the operator works according to the following procedures.

First, the operator takes out the unregistered commodity M from the shopping basket 6 with the right hand. Afterwards, confirms whether or not the commodity M is barcode attached. If the barcode is not attached, the operator touches the image of the [automatic recognition] button 43 with the left hand, or touches the image of the [automatic recognition] button 43 with the right hand after the left hand is changed to hold the commodity M. Afterwards, the operator holds the commodity over the scanning window 1B. Thus, if the commodity is correctly recognized, the operator puts the commodity in the shopping basket 7.

The scanning window 1B is formed in the center of the housing 1A. On one hand, the registration screen 40 is displayed on the touch panel 12 arranged at top of the housing 1A. Therefore, the operator touches the [automatic recognition] button 43 of the touch panel 12 by the hand without holding the commodity, raises the hand with commodity to touch the [automatic recognition] button 43, and then puts down it to hold the commodity over the scanning window 1B In this way, if the [automatic recognition] button 43 is arranged on the touch panel 12, the operator's work efficiency is reduced.

Figure 16:
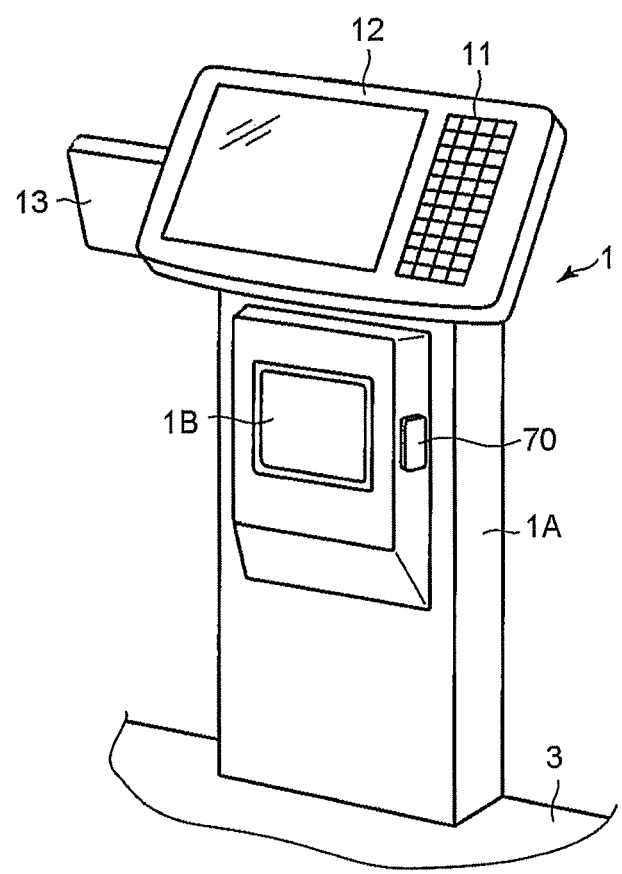
FIG. 16 is an outside perspective view of the commodity recognition apparatus in a fifth embodiment relates.

Therefore, in the fifth embodiment, as shown in FIG. 16, a contact operation component 70 is configured near a peripheral unit of the scanning window 1B in the commodity recognition apparatus 1 as the switch enabling the switching unit 33 to act. In an example in FIG. 16, the configuration location of the operation component 70 is arranged to be a side surface facing to the scanning window 1B and positioned on the right side of the scanning window 18, that is, the lateral side of the upstream direction along the customer's movement. The operation component 70 is a capacitive touch switch.

In the fifth embodiment, the operator carries out commodity registration work according to the following procedures. First, the operator takes out the unregistered commodity M from the shopping basket 6 with the right hand. Afterwards, confirms whether or not the barcode is attached to the commodity M. If the barcode is not attached, the operator touches the operation component 70 with the finger of the commodity holding right hand. Next, the operator holds the commodity over the scanning window 1B. Thus, if the commodity is correctly recognized, the operator puts the commodity in the shopping basket 7.

In this way, according to the fifth embodiment, a operator, in such a series of work that the operator moves the commodity taken out from the shopping basket 6 at the upstream side along the customer movement direction, and puts the commodity to the shopping basket 7 at the downstream side along the customer movement direction across the commodity recognition apparatus 1, can manually hold the barcode part of the commodity over the scanning window 1B to swipes the barcode through the commodity recognition apparatus 1 for the commodity with the barcode, and can manually hold the commodity M over the scanning window 1B after touches the operation component 70 to work the switching unit 33 for the commodity without the barcode. Therefore, even though the commodity with barcode attached and the commodity without barcode attached are mixed together, these plentiful commodities can be also registered smoothly, and therefore, the workload of the operator can be lightened.

In the fifth embodiment, the operation component 70 is a contact switch. Therefore, so long as the operator does not touch the operation component 70, the commodity recognition processing executed by the commodity recognition unit 31 cannot become valid. If a non-touch switch is used, if the operator waves the commodity over the scanning window 1B, the commodity recognition processing executed by the commodity recognition unit 31 becomes valid, thus, even though the barcode is attached, the commodity recognition processing with the low recognition processing is executed, and such a problem is impossibly generated in the fifth embodiment.

In addition, the invention of the embodiment is not limited to the above embodiments. For example, each embodiment is applied to the commodity recognition apparatus 1 of the checkout counter corresponding to the cashier, but an application example is not limited to that. For example, the invention of the embodiment can be also applied to a commodity recognition apparatus of a self-service checkout system by which the customer carries out the settlement. The commodity recognition apparatus 1 can be also assembled in the POS terminal 2 to be integrally formed. In brief, the invention of the embodiment can be applied to the checkout system consisting of the commodity recognition apparatus 1 and the POS terminal 2.

From the first embodiment to the fourth embodiment, the image of the [automatic recognition] button 43 is displayed on the registration screen 40 as an instruction enabling the switching unit 33 to act, but the switching unit 33 is not limited to that. For example, one key in keys configured on the keyboard 11 can be also used as the key with the same functions as the [automatic recognition] button 43. It is also the same for the [OK] button 44, the [quantity] button 45, the [recognition end] button 47 and the [cancelation] buttons 46 and 48, or the switching unit 33 can be also formed by a foot switch configured near the foot of the cashier (or customer). By operating such a foot switch with foot, the operability of a user can be improved.

In the fifth embodiment, the configuration location of the operation component 70 as the instruction enabling the switching unit 33 to act is arranged to face to the scanning window 1B and be positioned on the right side of the scanning window 1B, but the configuration location is not limited to that. For example, the configuration location can be also positioned at the upper side or the lower side of the peripheral unit of the scanning window 1B. The operation component 70 not only can be arranged to face to the scanning window 1B and be positioned on the right or left side of the scanning window 1B, but also but also can be positioned on the left side or the right side of the peripheral unit of the scanning window along the customer movement direction, even if it is s lane of reverse direction, there is correspondence merit.

In the second embodiment and the fourth embodiment, for the necessary [recognition end] button 47, the contact operation component can be also arranged at the peripheral unit of the scanning window 1B instead.

In the above embodiments, the image recognition screen 50 and the quantity input screen 60 are displayed on pop-up window overlapped the registration screen 40, but not limited to be displayed on pop-up window, and are displayed on the panel display unit 121 instead of being displayed on the registration screen 40.

In the above embodiments, the display of the image recognition screen 50 is taken as the notification unit, but the notification unit is not limited to that, and the non-default processing can be also formed by the notification unit such as other display, a voice to be notified as valid.

In the above embodiments, the data code recognition processing through the data code recognition unit 32 is taken as the default processing, but the commodity recognition processing through the commodity recognition unit 31 can be also taken as the default processing. In such a way, correspondence to the commodities with barcode attached (or other data code attached), the bigger the ratio of the commodities without barcode attached, the more effective the way is. The data code recognized by the data code recognition unit 32 is not limited to the barcode, for example, can be also a two-dimension code.

In addition, in the above embodiments, the appearance feature parameter according to the commodity category is stored in the commodity data file 8, but even though the image information of the commodity with the standard appearance is stored instead of the parameter, the commodity can be recognized by the commodity recognition unit 31.

In the above embodiments, the commodity recognition program realizing inventive functions is previously stored in the ROM 103 as a program storing unit in the apparatus, but not limited to that, the same program can be also downloaded in the apparatus from the network, or the same program stored in a storage medium can be also installed in the apparatus. The storage medium such as a CD-ROM, a storage card can be also in any forms, so long as the storage medium can store the program, and moreover, can be read by the apparatus. For the function which can be realized by the installation or the downloading of the program, the function can be also realized by synergistically acting with an OS (operating system) in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity recognition apparatus, comprising:
    an image capturing unit configured to capture an image of a commodity;
    a commodity recognition unit configured to recognize the commodity in the image;
    a data code recognition unit configured to recognize a data code attached to the commodity in the image from the image;
    a switching unit configured to set data code recognition processing executed by the data code recognition unit as a default processing, set commodity recognition processing executed by the commodity recognition unit as a non-default processing, and switch from a first state in which the default processing is valid to an second state in which the non-default processing is valid;
    a display controller configured to display, on a display unit, an image captured by the image capturing unit in response to determining that the non-default processing is switched to a valid status by the switching unit; and
    an output unit configured to output first information of the commodity recognized by the commodity recognition unit or second information of the data code recognized by the data code recognition unit.

2. The commodity recognition apparatus according to claim 1, wherein
    in response to the non-default processing becoming valid, the default processing becomes valid in response to a commodity or data code being recognized in the non-default processing.

3. The commodity recognition apparatus according to claim 1, further comprising:
    an announcement unit configured to announce an end of the non-default processing, wherein
    in response to the non-default processing becoming valid, a valid status is maintained before the end is announced by the announcement unit, and in response to the end being announced by the announcement unit, the default processing becomes valid.

4. The commodity recognition apparatus according to claim 1, further comprising:
    a notification unit configured to generate a notification that the non-default processing is valid.

5. The commodity recognition apparatus according to claim 1, further comprising:
    an insertion unit configured to execute the default processing determined to be invalid before executing the non-default processing determined to be valid by the switching unit, wherein
    in response to the non-default processing determined to be invalid being executed by the insertion unit and not recognized, the non-default processing thought determined to be valid is executed.

6. The commodity recognition apparatus according to claim 5, wherein
    in response to the non-default processing determined to be valid being executed and a commodity or data code being recognized, the default processing determined to be invalid becomes valid.

7. The commodity recognition apparatus according to claim 1, wherein
    the switching unit is further configured to perform the switching in response to detection, by a contact operation component arranged at the periphery of a scanning window, that the commodity is waved in front of the scanning window.

8. The commodity recognition apparatus according to claim 7, wherein the touch operation component is a capacitive touch switch.

9. A commodity recognition method, comprising:
    capturing a first image of a commodity;
    recognizing a commodity in the first image;
    recognizing a data code attached to the commodity in the first image;
    setting data code recognition processing as a default processing;

setting commodity recognition processing as a non-default processing;
switching from a first state in which the default processing is valid to a second state in which the non-default processing is valid;
displaying, on a display unit, a second image captured by the image capturing unit in response to the non-default processing being switched to a valid status; and
outputting first information of the recognized commodity or second information of the data code.

* * * * *